Oct. 29, 1957 P. KAELIN 2,811,587

TELEPHONE STATION

Filed Sept. 13, 1954 5 Sheets-Sheet 1

Oct. 29, 1957 P. KAELIN 2,811,587

TELEPHONE STATION

Filed Sept. 13, 1954 5 Sheets-Sheet 2

Oct. 29, 1957 P. KAELIN 2,811,587

TELEPHONE STATION

Filed Sept. 13, 1954 5 Sheets-Sheet 4

Oct. 29, 1957 P. KAELIN 2,811,587

TELEPHONE STATION

Filed Sept. 13, 1954 5 Sheets-Sheet 5

2,811,587
Patented Oct. 29, 1957

2,811,587

TELEPHONE STATION

Pierre Kaelin, Fribourg, Switzerland

Application September 13, 1954, Serial No. 455,563

Claims priority, application Switzerland September 16, 1953

5 Claims. (Cl. 179—90)

My invention has for its object a telephone station comprising a first arrangement producing call pulses controlled by means composing the call numbers, an arrangement recording the pulses also controlled by said call number composing means so that the latter may provide for the simultaneous production and recording of the pulses, the station being further designed in a manner such that the subscriber may, in case the called line is occupied, send a further call without having to dial again so as to compose the call number.

Figure 1:
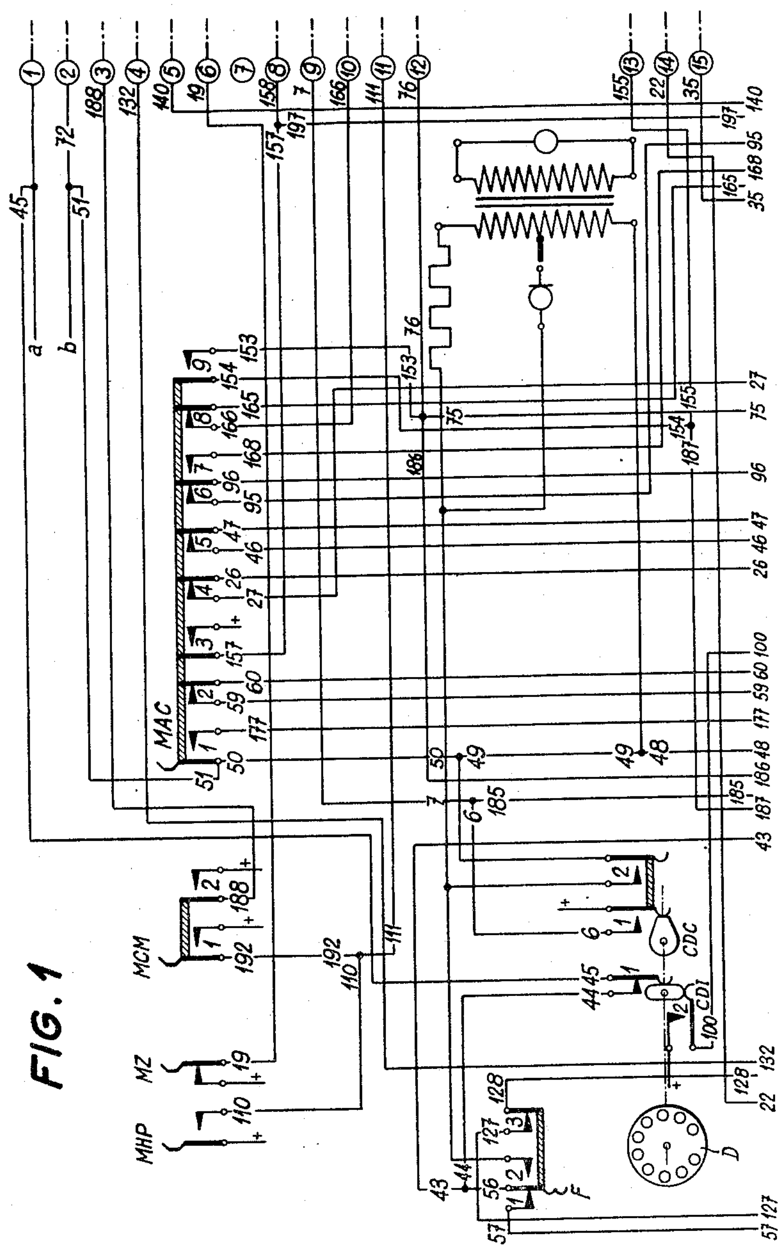
Figures 2, 6:
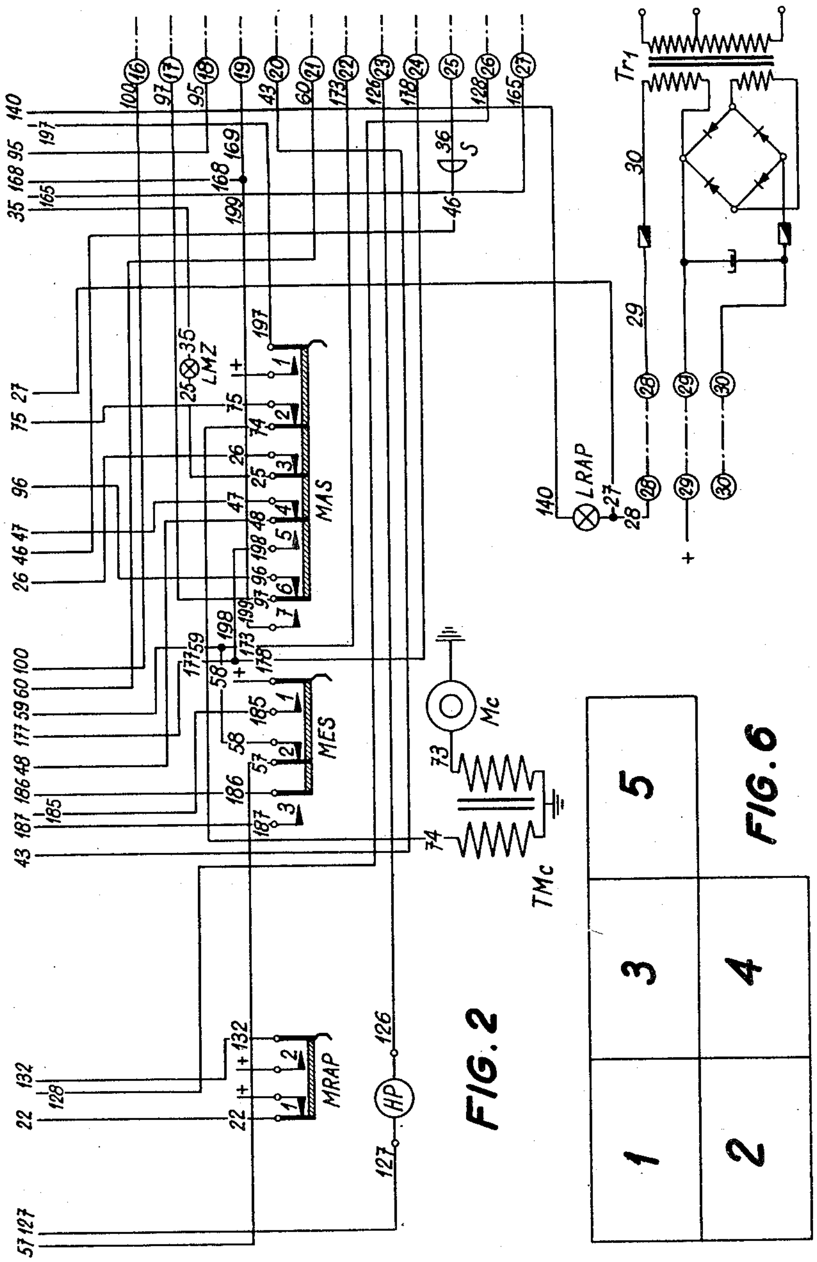

I have illustrated in accompanying drawings a preferred embodiment of my invention. In said drawings:

Figs. 1 to 5 illustrate each a section of the wiring diagram of the station and, when reading said drawings, they should be considered as positioned next to one another as shown in Fig. 6 which is a mere combination diagram.

The station illustrated includes as shown in Fig. 1 a plurality of manually operable keys, to wit: a loud-speaker control key MHP, a return to zero key MZ, a key MCM operating two switches for control of the transmission of messages and a key MAC for the automatic control of nine switches. I have also illustrated in said Fig. 1 the trunk telephone line *a—b*, a two-way microphone-carrying switch F and a dial D for composing the call numbers. This dial is adapted to act on a cam CDI controlling two switches and on a further cam CDC also controlling two switches.

The wiring diagram of Fig. 2 shows the following hand-operable switches, to wit those controlled by the key MRAP for the semi-automatic return of two switches, by the key MES for recording messages through the control of three switches and by the so-called sequential call key MAS controlling seven switches. Fig. 2 also illustrates a loud-speaker HP, a microphone M*c*, a transformer TM*c* for said microphone, a transformer $Tr_1$ producing an output current of 3.5 volts and two telltale lamps; of the latter, the lamp LMZ indicates whether a line is occupied and is housed inside the key MZ of Fig. 1, while the lamp LRAP detecting the operation of the relay returning the arrangement to reading conditions is housed inside the key MRAP. Lastly the bell is shown at S in Fig. 2.

Figure 3:
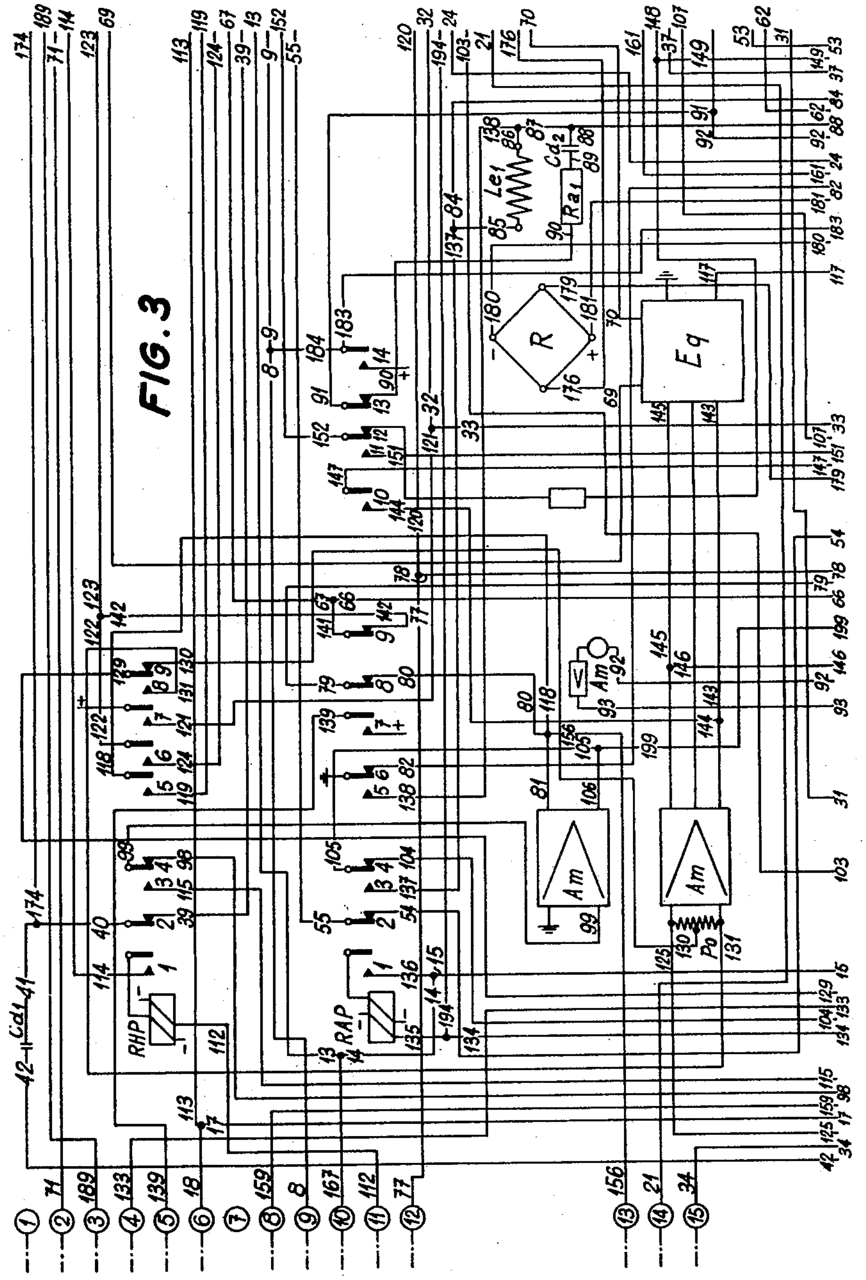

Fig. 3 illustrates two relays of which one forming the loud-speaker relay RHP controls nine switches, while the other RAP forms a semi-automatic return relay controlling fourteen switches. Fig. 3 also illustrates a condenser $Cd_1$ of a capacity of 1$\mu$f., an amplifier A*m*, a potentiometer P*o*, a rectifier R, an equilibrating system E*q*, a section $Le_1$ of a reading and recording system of which the second section $Le_2$ is illustrated in Fig. 5, a condenser $Cd_2$ of a capacity of 0.05$\mu$f. and a resistance $Ra_1$ of 270KΩ.

Figure 4:
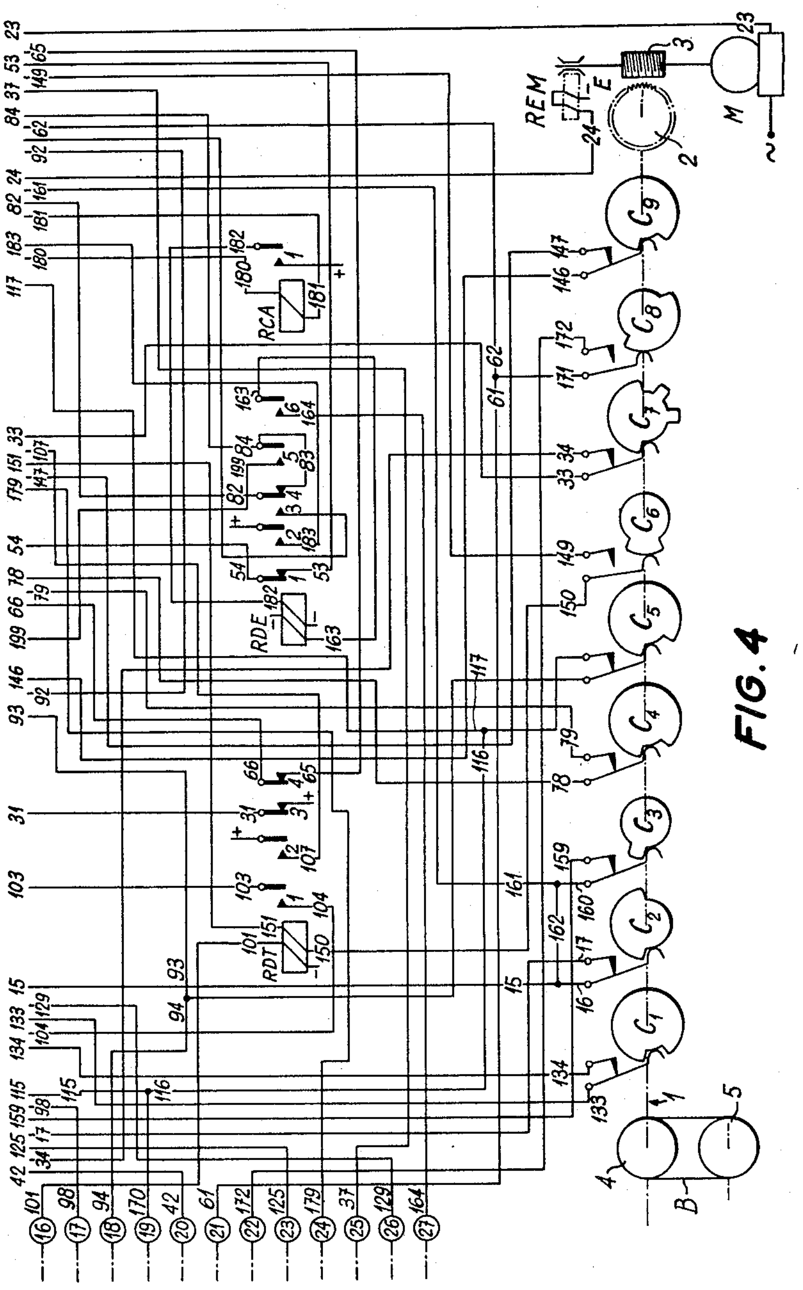

In Fig. 4 are illustrated three relays, to wit a relay RDT for the recording and repeating of the pulses, said relay controlling four switches, a sequence-releasing relay RDE for automatic control through six switches and a relay RCA responsive to the call current and controlling the switch. Fig. 4 illustrates furthermore a series of nine cams shown at $C_1$, $C_2$, $C_3$ . . . $C_9$, said cams being rigid with a common spindle shown diagrammatically at 1. This spindle carries a worm wheel 2 controlled by a worm 3 driven by a prime mover or motor M. The worm may be brought into and out of engagement with reference to the worm wheel 2, as provided by the clutch E controlled by the clutch relay REM. The spindle 1 also controls a spool 4 round which is wound a yielding magnetizable record strip B which is also wound over a second spool 5. This strip cooperating with the reading and recording means $Le_1$—$Le_2$ is an endless strip and is wound several times round the two spools 4 and 5. Means are provided to release the worm 3 with reference to the worm wheel 2 as soon as the prime mover is at a standstill and to return the spindle 1 automatically into a predetermined angular position corresponding to a predetermined angular position of the different cams and to a predetermined position of the strip B with reference to the reading and recording means.

Figure 5:
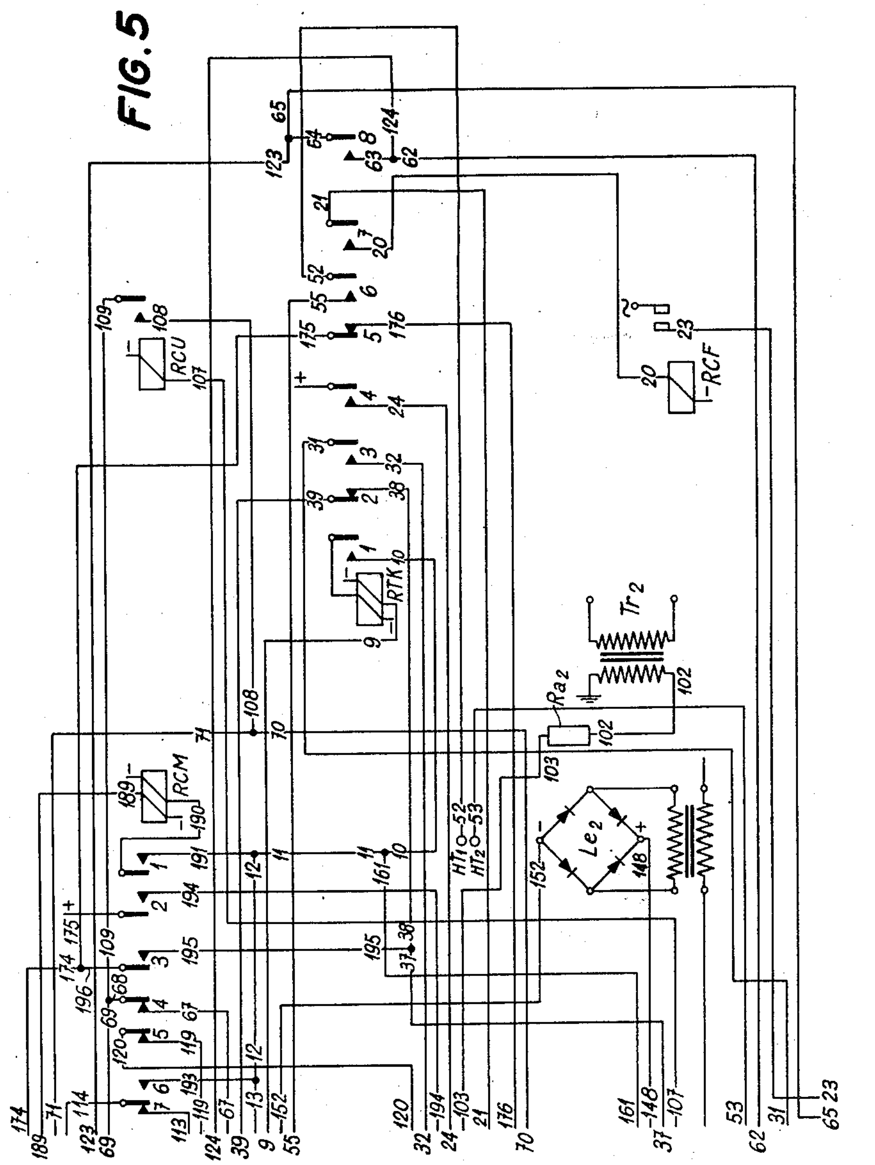

Lastly Fig. 5 illustrates four relays, to wit a message-transmitting relay RCM controlling seven switches, a delayed relay RCU controlling one switch, a main relay RTK controlling eight switches and a relay RCF operating under high intensity. Said Fig. 5 also shows two high voltage terminals HT in the reading and recording means, a resistance $Ra_2$ of 10KΩ and a transformer $Tr_2$ producing currents at a frequency of one hundred cycles.

The station further includes thirty terminals numbered from 1 to 30 and shown in Figs. 1 and 2 and repeated in Figs. 3, 4 and 2.

Various other parts of the station and chiefly its different circuits will be described fully in the following disclosure of the operation of the station.

Generally speaking, this operation distinguishes from that of an ordinary station through the following novel features:

Operation of the calling dial D transmits over the line a train of call impulses corresponding to the called number which is composed, as in the case of conventional telephone stations: but in addition thereto, this operation produces the recording of such pulses on the magnetizable strip B. Consequently the subscriber may, if the called line is occupied, renew this call without having to compose the called number again and it is in fact sufficient for him to depress a pusher knob so that the magnetizable strip, cooperating with the reading and recording means, may transmit the recorded train of pulses into the line. This operation of the pusher knob may be repeated as often as the subscriber may desire until he decides to wipe out the record, in principle when he has obtained the called number.

I will now describe the operation of the station in full detail:

In the case of an ordinary call, the subscriber before he composes the number he wishes to call, shifts the dial D through an arbitrary angular distance corresponding to any digit say 1, after which he holds the dial in the position obtained. This leads to the following results:

The switch 1, controlled by the cam CDC rigid with the dial, closes whereupon current from the positive terminal is fed through the wires 6 and 7 to the terminal point shown at 9 at the right hand side of Fig. 1 and at the left hand side of Fig. 3 and thence through the wires 8 and 9 to the main relay RTK (Fig. 5). This relay is then self-energized through the closing of its contact at 1. This feeds current into the wires 10, 11, 12, 13, 14, 15 and 16 and through the latter into a contact blade cooperating with the cam $C_2$ (Fig. 4). The outline of the latter is such that the switch controlled thereby and including last mentioned blade remains then closed during thirty seconds so as to be electrically connected through the wires 17 and 18 with the terminal 6 and thence through the wire 19 with the closed switch controlled by the key MZ, which is fed with energy by the positive terminal, whereby the relay RTK is, as stated, held in its energized condition. The different switches, controlled by said relay (or by any other relay) are numbered in sequence $RK_1$, $RK_2$ and so on.

The energization of the relay RTK leads to the following results: the switch $RTK_7$ closes and connects through the wire 20 the relay RCF with the wire 21 and consequently with the terminal 14, the wire 22 and the closed switch 1 controlled by the key MRAP, which latter switch is fed with current from the positive terminal. The relay RCF is thus energized and closes its switch so as to feed alternating current to the motor M through the wire 23. The motor M is started thus as soon as the subscriber operates the dial, with a view to composing the called number.

The switch $RTK_4$ also closes as a result of the energization of the relay RTK and feeds thereby current F from the positive terminal to the relay REM controlling the clutch E, through the wire 24. The energization of said relay REM (Fig. 4), causes the worm 3 to engage the worm wheel 2. The spindle 1 carrying the cams and the spool 4 controlling the strip B is thus driven into rotation.

The closing of the switch $RTK_3$ produces at the same time the ignition of the tell-tale bulb LMZ (Fig. 2). As a matter of fact, this bulb is permamently connected with the transformer $Tr_1$ through a wire 25, the closed switch 3 of the key MAS, a wire 26, the switch 4 controlled by the key MAC, the wires 27 and 28, the terminal 28 and lastly the wires 29 and 30. This circuit from the positive terminal over the bulb LMZ is closed at the moment of the closing of the contact-piece $RTK_3$, by the closed switch $RDT_3$ (Fig. 4) the wire 31 and the switch $RTK_3$ which is now closed and is connected through the wires 32 and 33 with the switch 33—34, controlled by the cam $C_7$ so as to open and close alternatingly said switch during thirty seconds, the current proceeds thence from the switch 33, 34 towards the terminal 15 so as to feed the bulb LMZ over the wire 35. By reason of the cam $C_7$ opening and closing alternatingly its switch, the tell-tale bulb LMZ is ignited intermittently and is extinguished after thirty seconds. The part played by said bulb will be disclosed hereinafter.

The switch $RTK_2$ opens at the same time so as to prevent the bell S from ringing during the transmission of the pulses. The circuit of the bell S, thus opened by the relay RTK, includes as follows:

Firstly between the bell and the wire *a*: the bell S (Fig. 2), the wire 36, the terminal 25, the wires 37 and 38, the switch $RTK_2$, the wire 39, the closed switch $RHP_2$, the wires 40 and 41, the condenser $Cd_1$, the wire 42, the terminal 20, the wires 43 and 44, the switch 1 controlled by the dial-controlled cam CDI, the wire 45 and the wire *a*.

Secondly, between the bell S and the other wire *b*: the wire 46, the closed switch No. 5 controlled by the key MAC, the wire 47, the closed switch No. 4 of the key MAS, the wires 48, 49, 50 and 51 and the wire *b*.

It should be remarked that during an operative step to be disclosed hereinafter, the relay RCM (Fig. 5) is energized and closes its switch No. 3 so as to short-circuit the gap in the bell circuit across the open switch $RTK_2$ while the operation of the fifth switch $RTK_5$ will be examined later on.

The sixth switch $RTK_6$ provides for the wiping out of the record on the strip B which is being driven forwardly, as provided by the operation of the reading and recording means $Le_1$—$Le_2$. To this end, the two high voltage terminals $HT_1$ and $HT_2$ (Fig. 5) of the reading and recording means are interconnected through a wire 52, starting from the terminal $HT_1$, the switch $RTK_6$, the wire 55, the closed switch $RAP_2$, the wire 54, the closed switch $RDE_1$ and the wire 53 leading to the terminal $HT_2$.

The next switch $RTK_8$ closes the central or trunk circuit *a—b* in a manner which corresponds to the conventional movement of the two-way switch or fork F, as executed in standard stations when the microphone carrier is lifted. This closing of the central circuit, i. e., the connection between the trunk line wires *a* and *b*, is performed through the following parts: wire *a*, wire 45, switch No. 1 controlled by the cam CDI, wires 44 and 56, closed switch No. 1 of the two-way switch F, wire 57, closed switch No. 2 of the key MES, wires 58 and 59, closed switch No. 2 controlled by the key MAC, wire 60, terminal 21, wires 61, 62 and 63, switch $RTK_8$ (now closed), wires 64 and 65, closed switch $RTD_4$, wires 66 and 67, closed switch $RCM_4$, wires 68 and 69, equilibrating means *Eq* (Fig. 3), wires 70 and 71, terminal 2, wire 72 and lastly wire *b*.

Thus the wires *a* and *b* are interconnected and the central or trunk circuit is closed.

This first operation of the dial D ensures thus on the one hand a closing of the central circuit as if the subscriber had lifted his microphone and on the other hand this first operation starts the prime mover M and consequently the magnetized strip B.

The speed of the strip and its length are defined in a manner such that the subscriber is allowed two seconds to give out first by speech the number he wishes to call. This indication is recorded on the strip in the following manner:

The microphone *Mc* is connected with the transformer TM*c* through a wire 73 which is in its turn connected with the amplifier A*m* through the wire 74, the closed contact No. 2 of the key MAS, the wires 75 and 76, the terminal 12, the wires 77 and 78, the switch controlled by the cam $C_4$ and which remains closed during two seconds, the wire 79, the closed switch No. 8 of the relay RAP and the wires 80 and 81. The amplifier A*m* controls the reading and recording means $Le_1$—$Le_2$ through the following circuit: the negative terminal, the closed switch No. 6 of the relay RAP (Fig. 3), the wire 82, the switch No. 4 of the relay $RDE_1$, the wires 83, 84 and 85 and the reading means $Le_1$; the latter is connected through the wires 86, 87 and 88 with the condenser $Cd_2$ and through the wire 89 with the resistance $Ra_1$ (Fig. 3). From the latter, the circuit continues over the wire 90, the closed switch 13 of the relay RAP, the wires 91 and 92, the last stage of the amplifier A*m*, the wires 93 and 94, the terminal 18, the wire 95, the closed switch No. 6 of the key MAC, the wire 96, the closed switch No. 6 of the key MAS, the wire 97, the terminal 17, the wire 98, the closed switch No. 4 of the relay RHP (Fig. 3), the wire 99 and lastly the amplifier A*m*.

The subscriber waits until a musical sound is heard in the loud-speaker HP and he then releases the dial D; he may then compose the called number in the conventional manner.

As disclosed hereinabove, the operation of the dial produces, through the switch No. 1 on the cam CDI, the closing of the central or trunk circuit *a*, *b*, so that the train of pulses is sent into the circuit in the usual manner. Furthermore, since the switch No. 2 of the cam CDI connects the positive terminal with the relay RDT (Fig. 4), through the wire 100, the terminal 16 and the wire 101, said relay RDT is energized at each pulse. This succession of energizations and deenergizations of the relay RDT products the recording of the called number, as explained hereinafter. It should be remarked that, whereas for sending the train of pulses into the circuit, the switch No. 1 of the cam CDI opens at each pulse, the recording of the pulses is performed by the closing of the switch No. 2 of said cam CDI at each pulse.

The recording of the pulses is performed as follows: from the transformer $Tr_2$ (Fig. 5) producing alternating current at a frequency of 100 cycles, the current is fed through the wire 102 into the resistance $Ra_2$, which prevents the intensity from rising too considerably at the input of the amplifier A*m*. From the resistance $Ra_2$, the current is fed through the wire 103 to the switch $RDT_1$ which opens and closes so as to transmit the pulses to the recording means, and thence through the wire 104 to the closed switch No. 4 of the relay RAP and through the wires 105 and 106 into the input of the amplifier A*m*. The connection between the amplifier and the section $Le_1$ of the reading and recording means is the same as that described hereinabove with reference to the calling operation. It should be remarked that, during the recording step, the loud-speaker HP is energized under low power conditions, which allows the subscriber to listen to what is going on.

The different switches controlled by the relay RDT play also the following parts: its switch No. 2 feeds current from the positive terminal, through the wire 107 into the delayed relay RCU (Fig. 5) which remains energized during the transmission of the pulses of the called number since it is not given time enough to become deenergized between the successive digits or characters of the dialled called number. The relay RCU has for its object to short-circuit through its switch the equilibrating means (Fig. 3) of the amplifier A*m* with a view to improving the grade of the pulses sent through the circuit *a—b*. The connection is as follows: one terminal of the equilibrating means is connected through the wires 70 and 108 with one side of the switch of the relay RCU while its other terminal is connected with the other side through the wires 69 and 109.

I will now return to the switches No. 3 and No. 4 of the relay RDT; the switch No. 3, as it opens, switches off the tell-tale bulb LMZ the circuit of which has been described hereinabove, and the part played by the switch No. 4 will be described later on with reference to the repetition step.

The magnetic strip B is of a length such and its speed of progression is such that it executes one revolution in thirty seconds. It is thus necessary for the call and recording to last together less than thirty seconds. This is the reason why the tell-tale bulb LMZ which is intermittently ignited is completely extinguished after a period of thirty seconds so as to show that the recording should be finished or more precisely that the subscriber should begin composing the call number. When the call number has been composed, the subscriber waits for the loud-speaker to give information. The loud-speaker states then under low power conditions whether the called line is free or occupied.

In the first case, where the called line is free, the subscriber depresses the key MHP (Fig. 1) controlling the loud-speaker. The current from the positive terminal passes then through the wires 110 and 111 and reaches the terminal 11 beyond which it is fed through the wire 112 into the relay RHP (Fig. 3) which is self-energized through the closing of its switch No. 1 over the manually closed key MZ (Fig. 1), the wire 19, the terminal 6, the wire 18, the wire 113, the closed switch No. 7 of the relay RCM and lastly the wire 114 leading up to the switch No. 1 of the RHP relay which is thus held in its energized state.

The energization of the relay RHP produces the following results: its switch No. 2 opens and switches off the bell the circuit of which has been described hereinabove. The switch No. 3, as it closes, connects the output of the amplifier A*m* with the equilibrating means E*q*, as provided by connecting the wire 99 with the wires 115, 116 and 117, the wire 117 leading up to the equilibrating means. This connection allows listening to the conversation through the loud-speaker, which is now operating at full power as described hereinafter.

The switch $RHP_5$ maintains the connection between the microphone M*c* (Fig. 2) and the amplifier A*m*; from the latter, the wires 81 and 118 lead to the switch No. 5 of the relay RHP, connected through a wire 119 with the closed switch No. 5 of the relay RCM and through the wires 120 and 77 with the terminal 12. The connection between said terminal 12 and the microphone has already been described.

The switch No. 7 of the relay RHP maintains the tell-tale lamp LMZ ignited through the following circuit: the current from the positive terminal is fed through said switch No. 7 to the wires 121 and 33 leading to the switch controlled by the cam $C_7$. From last-mentioned switch, a circuit already described reaches the lamp LMZ.

The switch No. 6 $RHP_6$ duplicates the switch No. 8 of the relay RTK which is deenergized after thirty seconds, the switches $RHP_6$ and $RTK_8$ being in parallel relationship as provided on one hand by the wires 122—123 and 64 and on the other hand by the wires 124 and 63. The switch $RHP_6$ serves thus for keeping the line-circuit in its closed condition in the same manner as this was obtained precedingly by the switch $RTK_8$.

The switch No. 8 of the relay RHP provides for operation at full power of the loud-speaker which had been energized precedingly at a reduced power through the switch No. 9 of the relay RHP and the potentiometer P*o*. The circuit feeding the loud-speaker HP is as follows: the output of the amplifier A*m* (Fig. 3), is connected through a wire 126 with the loud-speaker HP. The circuit of the latter continues through the wire 127, the switch No. 3 of the two-way microphone-carrier fork F, the wire 128, the terminal 26 and the wire 129 leading to both switches Nos. 8 and 9 of the relay RHP. When the switch No. 9 is closed, i. e. when the relay RHP is deenergized, the wire 129 is connected through the wire 130 with the potentiometer P*o* so that the loud-speaker operates at a reduced power. In contradistinction, when the switch No. 8 is closed, i. e., when the relay RHP is energized, the wire 129 is connected directly through the wire 131 with the amplifier A*m* so that the loud-speaker operates at full power and conversation may take place.

During conversation, the relay RTK is deenergized since the cam $C_2$ opens the corresponding switch connecting the wires 16 and 17 so as to maintain the energization of said relay RTK. This deenergization occurring after thirty seconds as mentioned hereinabove deenergizes the relay RCF by opening the switch $RTK_7$ which feeds as disclosed the relay RCF. It is therefore no longer possible to record; but the record already executed remains on the endless strip B. The prime mover M stops, the clutch E is disconnected and the strip B returns automatically into its original position under the action of spring means which are not illustrated. The stopping of the strip is thus obtained always for a well defined position.

When the conversation is at an end, the subscriber or the like operator depresses the key MZ (Fig. 1), so as to open the corresponding switch and to cause the relay RHP to be deenergized by opening the above-described self-energizing circuit of the latter. The deenergization of this relay RHP switches off the trunk circuit and the whole system returns into its inoperative condition.

In the second case to be considered, that of the called line being occupied, the subscriber hears the occupation signal in the loud-speaker operating under low power conditions. After thirty seconds, the relay RTK becomes inoperative by reason of the cam $C_2$ opening its switch, which as just mentioned produces a stoppage of the prime mover while the endless magnetic strip returns automatically into its starting position. The occupation signal is no longer heard but the dialled number remains recorded together with the call.

When the subscriber wishes again to call the same call number, he depresses the key MRAP (Fig. 2) and holds it depressed until he hears the musical sound in the loud-speaker. This leads to the closing of the switch No. 2 of the key MRAP, which connects the positive terminal with the terminal 4 through the wire 132. Beyond the terminal 4 the current reaches the relay RAP (Fig. 3) through the wire 133, the switch controlled by the cam $C_1$ and the wires 134 and 135. It should be remarked that the switch controlled by the cam $C_1$ is closed only when the cams and the magnetic strip occupy their inoperative positions. Thus, an untimely operation of the key MRAP, while the motor or the like prime mover M is still running, would be inoperative since the switch controlled by the cam $C_1$ is then open. It should also be remarked that the switch No. 1 of the key MRAP remains open as long as the subscriber presses said key down; the object of this arrangement will be disclosed hereinafter.

The closing of the relay RAP leads to the following results: its switch No. 1 serves for maintaining the relay RAP energized; the current from the positive terminal is fed to the closed switch controlled by the key MZ and thence to the relay RAP through the wire 19, the terminal 6, the wires 18 and 17, the switch controlled by the cam $C_2$, the wires 16 and 15 and the wires 136 leading to the switch $RAP_1$ which provides thus for the self-energization of the relay RAP.

The switch No. 2 of the relay RAP prevents the record on the strip which is being unwound for a single reading from being wiped out. The opening of said switch $RAP_2$ breaks the wiping out circuit described precedingly.

The switch $RAP_3$ energizes the reading means $Le_1$ through the following circuit: amplifier A*m* (Fig. 3), wires 106 and 105, switch $RAP_3$, wire 137, wire 85, reading means $Le_1$. At the same time, the switch $RAP_4$ opens and breaks the recording circuit described hereinabove.

The switch $RAP_5$ connects the negative terminal through the wire 138 and the wire 86 with the second terminal of the reading means $Le_1$.

The switch $RAP_7$ ignites the tell-tale lamp LRAP (Fig. 2). This tell-tale lamp is permanently connected with the transformer $Tr_1$, through the wires 30 and 29, the terminal 28 and the wire 28. When it closes, the switch $RAP_7$ connects the positive terminal with the circuit of the lamp LRAP through the wire 139, the terminal 5 and the wire 140.

The switch $RAP_8$ switches off the microphone M*c* as required since no further recording is to be performed. Said switch, when it opens, breaks the above described microphone circuit.

The switch No. 9 of the relay RAP opens simulataneously so as to open the shunt across the switch No. 4 of the relay RDT; a wire 141 connects this switch No. 9 with the wire 66 leading to $RDT_4$ while a wire 142 connects again said switch No. 9 with $RDT_4$ through the wires 123 and 65. This shunt short-circuiting the switch $RDT_4$ prevents the pulses, sent through the line *a, b,* during the simultaneous formation and recording of the call number by means of the dial D, from being sent out through the relay RDT and causes them to be transmitted directly by the said dial.

The switch 10 at $RAP_{10}$ modifies the equilibrium of the loud-speaker circuit so as to allow hearing the loud-speaker under reduced power conditions at the moment of the transmission of the spoken called number; this modification in equilibrium is obtained by short circuiting one of the windings of the equilibrating means E*q* through one terminal of said winding, the wires 143 and 144 leading to the switch $RAP_{10}$ while the other terminal of the winding is connected with the latter through the wires 145 and 146, the switch controlled by the cam $C_9$ and the wire 147.

The switch $RAP_{11}$ is not actually operative when the relay RAP is energized, since, at the moment considered, the switch controlled by the cam $C_6$ is open. The operation of $RAP_{11}$ when the last-mentioned switch is closed will be described hereinafter.

When the switch $RAP_8$ opens, it breaks the recording circuit by opening the above described connection between the output of the amplifier A*m* and the reading and recording means $Le_1$.

When the subscriber hears the musical sound, he releases the key MRAP.

The relay RAP remains operative by reason of the self-energizing switch $RAP_1$ being closed. The switch $MRAP_1$ closes again and makes the above-described circuit energizing the relay RCF. As also disclosed precedingly, the energized relay RCF produces the starting of the motor M.

The strip B begins then unwinding. During the first two seconds, the subscriber hears the spoken called number, the reading means being energized by the switch $RAP_3$ as just disclosed. After these two seconds, the cam $C_6$ energizes the relay RDT through the following circuit: the positive terminal of the reading and recording means $Le_2$ (Fig. 5), the wires 148 and 149, the switch controlled by the cam $C_6$, the wire 150, the relay RDT, the wire 151, the switch $RAP_{11}$ which is still closed, the wire 152 and the negative terminal of $Le_2$.

The relay RDT being energized, the corresponding switches execute the same operations as precedingly, except for $RDT_4$ which is no longer short-circuited by reason of the opening of $RAP_9$ as disclosed hereinabove and becomes operative so as to allow the transmission through the line *a, b,* of the train of pulses from the reading means.

Each time the relay RDT is energized, its switch No. 4 opens and breaks the trunk circuit. The connection between the latter and said switch $RDT_4$ is provided through the wire *a*, the wire 45, the switch No. 1 controlled by the cam CDI, the wires 44 and 56, the switch No. 1 controlled by the microphone-carrying fork F, the wire 57, the closed switch No. 2 controlled by the key MES, the wires 58 and 59, the closed switch No. 2 of the key MAC, the wire 60, the terminal 21, the wires 61, 62 and 124, the closed switch $RHP_6$, the wires 122, 123 and 65 and lastly the switch $RDT_4$. On the other hand, the circuit wire *b* is connected through the wire 72, the terminal 2, the wires 71 and 108, the closed switch controlled by the relay RCU, the wires 109 and 68, the closed switch $RCM_4$, the wires 67 and 66, with the switch $RDT_4$.

Turning to the automatic control means, the station illustrated allows also listening to what is happening at said station. This automatic control is of interest, for instance, for a subscriber who has left a child alone at home and wishes to ascertain from time to time whether anything abnormal is occurring. To this end, before leaving his home, the subscriber engages the key MAC (Fig. 1) which leads to the following results:

The switch No. 9 controlled by the key MAC connects the microphone M*c* (Fig. 2) with the amplifier A*m* (Fig. 3), said connection being provided through the microphone M*c*, the wire 73, the transformer TM*c*, the wire 74, the closed switch $MAS_2$, the wires 75 and 153, the switch $MAC_9$, the wires 154 and 155, the terminal 13, the wires 156 and 81 and the amplifier A*m*.

The switch No. 3 of the key MAC serves for maintaining the relays RTK and RAP energized through the agency of the cam $C_3$, the switch controlled by which remains closed during sixty seconds, i. e. during the time required for the listening. The circuits concerned are respectively as follows: on one hand, $MAC_3$ which is the switch considered, the wires 157 and 158, the terminal 8, the wire 159, the switch controlled by the cam $C_3$, the wires 160, 161 and 10 and the self-energizing switch $RTK_1$, while on the other hand, the wire 160 is connected with a wire 162 leading through the wires 15 and 136 to the switch $RAP_1$ which holds the relay RAP energized.

The switch No. 8 of the key MAC is open and prevents the relay RDE from remaining energized. As a matter of fact, the switch No. 6 of said relay RDE which keeps it energized through the wire 163, is now controlled by the cam $C_3$ through the following circuit: wire 154, terminal 27, wire 165, the now open switch $MAC_8$, the wire 166, the terminal 10 and wires 176, 14, 15, 162 and 160, which latter leads to the switch closed by the cam $C_3$.

The switch $MAC_7$ connects the output of the amplifier A*m* with the equilibrating means E*q* in the following manner: amplifier A*m*, wire 99, closed switch $RHP_4$, wire 98, terminal 17, wire 97, switch $MAS_6$, now closed, wire 96, closed switch $MAC_7$, wires 168 and 169, terminal 19, wires 170, 116 and 117 and equilibrating means E*q*.

The switch $MAC_4$ opens the above described circuit feeding the lamp LMZ.

The switch $MAC_2$ opens the trunk circuit also described precedingly. It should be remarked that the switch controlled by the cam $C_8$ is inserted shuntwise with the said switch $MAC_2$ and closes the trunk circuit after twenty seconds. To this end the switch controlled by the cam $C_8$ is connected on one hand through the wire 171 with the wire 61 connected with $MAC_2$, as already described hereinbefore, and on the other hand through a wire 172 with the terminal 22 and thence through the wires 173 and 59 with the said switch $MAC_2$. Lastly, the switch $MAC_1$ connects the trunk line wires *a*—*b* with the rectifier RC (Fig. 3) through the following circuit: firstly from the wire *a* through the wire 45, the switch $CDI_1$, the wires 44 and 43, the terminal 20, the wire 42, the condenser C$d_1$, the wires 41, 174 and 175, the closed switch $RTK_5$, the wire 176 to the rectifier R; secondly from the other line wire *b* through the wire 51, the switch $MAC_1$, the wires 177 and 178, the terminal 24, the wire 179 and again to the rectifier R. The control of the station is thus obtained by calling from any other station the station of which the subscriber has previously operated the key MAC. This calling leads to the following results: the relay RCA checking the call (Fig. 4) is connected with the rectifier R through the wires 180 and 181. Consequently, it is energized at the moment at which the trunk line *a*, *b* receives the call current rectified by R. The switch of the relay RCA feeds as it closes current from the positive terminal through the wire 182 to the relay RDE. The switch $MAC_8$ being open, as disclosed, the relay RDE cannot remain energized; but it energizes the relay RTK by closing the switch $RDE_2$ which feeds current from the positive terminal, through the wires 183 and 184 and the wire 9, to the relay RTK.

The relay RTK remains operative during sixty seconds because its self-energizing circuit passes as disclosed precedingly through the switch controlled by the cam $C_3$ when the key MAC is operated.

The part played by the different switches controlled by RTK has been described hereinabove, except for $RTK_5$: the latter when it opens breaks the circuit of the rectifier described hereinabove.

After sixty seconds of the control operation, the cam $C_3$ opens its switch and releases the relay RTK which in its turn breaks the connection between the trunk line *a*, *b*, and the rectifier R.

Sequential operation is obtained with the station according to my invention inasmuch as it allows recording a message to be transmitted from the subscriber's station, in the case of the subscriber being called during his absence. This sequential operation includes three different stages, to wit: recording of the message by the subscriber, checking of the record by the subscriber and transmission of the message when the subscriber's station is called.

The recording of the message is executed by depressing the key MES (Fig. 2), the keys MAC and MAS being inoperative. The switch $MES_1$ energizes the relay RTK through the circuit starting from the positive terminal and leading through the wires 185 and 7, the terminal 9, the wires 8 and 9 to the relay RTK. The latter remains self-energized through its switch No. 1, as already disclosed, and through the switch controlled by the cam $C_2$, i. e. during thirty seconds.

The different switches controlled by RTK play the parts described precedingly, with the difference that the trunk circuit is not closed. As a matter of fact, said trunk circuit, closed by the switch $RTK_8$, passes through the switch $MES_2$ which is now open by reason of the key MES being depressed. The trunk circuit being open, no musical sound is produced and this is essential so that the latter may not be recorded simultaneously with the message. The switch $MES_3$ connects the microphone M*c* with the amplifier A*m* through the following circuit: M*c*, wire 73, transformer TM*c*, wire 74, closed switch $MAS_2$, wire 75, wire 186, switch $MES_3$, wires 187 and 155, terminal 13, wires 156 and 81, amplifier A*m*.

The subscriber may thus dictate his message which is thus recorded, without its length ever exceeding thirty seconds.

The message may then be controlled by the subscriber who depresses momentarily the key MCM while the keys MAS and MAC remain still inoperative. The switch $MCM_2$ energizes its controlling relay MCM through the following circuit: positive terminal, switch $MCM_2$, wire 188, relay RCM.

This relay RCM is held in its energized condition by the following circuit: wire 190, switch No. 1 of RCM, wire 191, wires 11, 161, 162 and 16, the switch closed by the cam $C_2$ during thirty seconds, wires 17 and 18, terminal 6, wire 19 and closed contact of MZ.

The switch $MCM_1$ energizes the relay RHP through the wires 192 and 111, the terminal 11 and the wire 112. This relay RHP is self-energized during thirty seconds and is connected with the switch controlled by the cam $C_2$ through the wire 114, the closed switch $RCM_6$, the wires 193, 13, 14 and 15. The parts played by the different switches controlled by the relay RHP are those described hereinabove.

The different switches controlled by the relay RCM operate in the following manner:

The switch $RCM_2$ energizes the relay RAP by connecting the positive terminal with the wire 194 connected with the wire 135. The part played by the different switches controlled by the relay RAP has already been described, except for the switch $RAP_{14}$ which when closed connects the positive terminal with the wire 9 leading to the relay RTK which is thus energized.

I have already described the operation of the different switches controlled by the relay RTK. It should be noted that the switches Nos. 2, 5, 6 and 8 of RTK have no part to play in the present case and that said relay RTK is self-energized through its switch $RTK_1$ during thirty seconds under the control of the cam $C_2$, as described hereinabove. The fourth switch $RCM_4$ breaks the trunk circuit through action on the equilibrating means E*q* so as to cut out any unnecessary occupation of the line and also so as to allow the bell to operate during the control of the message to be transmitted. This central or trunk circuit has already been defined. Furthermore, to provide for operation of the bell, it is necessary to bridge the gaps in its circuit across the switches $RTK_2$ and $RHP_2$. This bridging is ensured by the switch $RCM_3$ which substitutes for the fraction of the bell circuit located between the wires 38 and 40 and including the switches $RTK_2$ and $RHP_2$, the circuit element constituted by the wire 195, the now closed switch $RCM_3$ and the wires 196 and 174.

The switch $RCM_5$ breaks the circuit defined hereinabove connecting the microphone M*c* with the amplifier A*m*.

The relay RCF energized by $RTK_7$ starts the motor M and the switch $RTK_7$ energizes the relay REM so as to ensure a coupling of the worm 3 with the worm wheel 2; the recorded message is then heard.

After thirty seconds, the switch controlled by the cam $C_2$ opens and the relays RTK, RCM, RAP, and RCF are deenergized. The subscriber presses then the key MZ down so as to deenergize the relay RHP.

The actual sequential operation, consisting in the transmission of the message is provided as follows: before leaving, the subscriber depresses the key MAS which controls the following switches which operate as follows: $MAS_1$ feeds the switch controlled by the cam $C_3$ through the wire 197, the wire 158, the terminal 8 and the wire 159. The cam $C_3$ controls its switch so as to hold the relays RTK and RDE energized during sixty seconds, their energization being described hereinafter:

$MAS_2$ breaks the circuit, already described, connecting the microphone with the output of the amplifier.

$MAS_3$ prevents the lamp LMZ from being lit.

$MAS_4$ breaks the bell circuit.

$MAS_5$ connects the trunk circuit with the rectifier by connecting the wire 198 with the wire 48 which is in its turn connected with the line wire *b* through the wires 49, 50 and 51; the said wire 198 is in its turn connected with the wire 178 leading as already described to the rectifier R.

$MAS_6$ switches off the connection between the amplifier and the rectifier R.

$MAS_7$ connects the amplifier with the equilibrating means by connecting the wire 97 with the wire 199 leading to the wire 169, forming part as already described of the circuit of the equilibrating means. As the rectifier is energized by the trunk circuit, a call from the exchange will make the relay RAC respond to the pulses of the call current and energize through the wire 182 the relay RDE which remains self-energized through its switch $RDE_6$.

The switch $RDE_2$ energizes then the relay RTK which latter energizes through $RTK_7$ the relay RCF whereby the motor M is started and the relay RTK also engages through RTK the worm 3 with the worm wheel 2. Furthermore, the switch $RDE_5$ connects the reading means $Le_1$ with the amplifier *Am* through the circuit section including the wires 85 and 84, the switch $RDE_5$, the wire 199, the wire 106 and the amplifier *Am*.

The switch $RDE_1$ prevents the wiping out of the record by breaking the circuit leading to the terminals $HT_1$ and $HT_2$ (Fig. 5) and described hereinabove.

The operation of the different switches of the relay RTK which is kept energized during sixty seconds by the cam $C_3$ has already been described.

Since the motor is now operative the strip unwinds so that the calling station hears the message that has been previously recorded by the subscriber.

It should be well understood that the above described equipment may be either an original part of a subscriber's telephone set or an additional part adaptable to a telephone set already in use.

What I claim is:

1. A telephone station cooperating with a trunk line, comprising a first arrangement adapted to transmit call pulses through the latter, dialling means for composing call numbers, adapted to control the said first arrangement, a cam controlled by the dialling means, two switches controlled by the said cam, means whereby the first switch when operated makes and breaks the circuit through the trunk line and sends pulses into the latter, a relay controlled by the second switch, reading and recording means controlled by said relay and adapted to record the pulses simultaneously with the transmission of the pulses by the first arrangment, a second arrangement controlled by the pulse-recording means and adapted to transmit the recorded pulses into the trunk line and manually operable means adapted to render last-mentioned arrangement operative to produce further calls after an ineffectual call performed through the first arrangement.

2. A telephone station cooperating with a trunk line composing dialling means for composing call numbers, a cam controlled by the dialling means, two switches controlled by the said cam, means whereby the first switch when operated makes and breaks the circuit through the trunk line and sends pulses into the latter, a relay controlled by the second switch, reading and recording means controlled by siad relay and adapted to record the pulses simultaneously with the transmission of the said pulses by the first switch, a second relay associated with the first relay and adapted to prevent operation of the first switch during operation of the call number composing means and manually operable means adapted to render said second relay operative to produce a further call without any resorting to the dialling means.

3. A telephone station cooperating with a trunk line comprising dialling means adapted upon operation to close the trunk line, a cam controlled by the dialling means, two switches controlled by said cam, means whereby the first switch when operated makes and breaks the circuit through the trunk line and sends pulses into the latter, a first relay controlled by the second switch, reading and recording means controlled by said first relay and adapted to record the pulses simultaneously with the transmission of the said pulses by the first switch, a second relay, means controlled by the second relay and adapted, when deenergized, to short-circuit the first switch, further means controlled by the second relay and adapted to prevent operation of the second switch when the second relay is operative, manually operable means adapted to render said second relay operative and means whereby said second relay when operative makes the reading and recording means feed the recorded pulses into the trunk circuit.

4. A telephone station cooperating with a trunk line comprising a first arrangement adapted to transmit call pulses through the trunk line, means for composing call numbers adapted to control the said first arrangement, means adapted to record sounds and pulses and controlled by the means composing the call numbers, to be operative simultaneously with the first, pulse-transmitting arrangement, a second arrangement controlled by the sound and pulse-recording means and adapted to transmit the recorded pulses into the trunk line, a microphone operatively connected with the sound and pulse-recording means and adapted to record intelligence on the latter and manually operable means adapted to make said second arrangement operative to produce a call without any resorting to the first arrangement.

5. A telephone station cooperating with a trunk line, comprising a first arrangement adapted to transmit call pulses through the trunk line, means for composing call numbers, adapted to control the said first arrangement, means adapted to record sounds and pulses and controlled by the means composing the call numbers, to be operative simultaneously with the first, pulse transmitting arrangement, a second arrangement controlled by the sound and pulse-recording means and adapted to transmit the recorded pulses through the trunk line, a microphone operatively connected with the sound and pulse-recording means and adapted to record a message on the latter, means whereby the recorded message is transmitted automatically through the trunk line, whenever the station is called by another station, and manually operable means adapted to make the second arrangement operative to transmit the recorded pulses to produce a call without resorting to the first arrangement.

References Cited in the file of this patent

UNITED STATES PATENTS 2,314,801 Roberts et al. ............ Mar. 23, 1943